United States Patent [19]

Withrow

[11] Patent Number: 4,966,619
[45] Date of Patent: Oct. 30, 1990

[54] DEAD PLATE ASSEMBLY

[75] Inventor: Shelby M. Withrow, Paradise, Tex.

[73] Assignee: Union Oil Company of California, Los Angeles, Calif.

[21] Appl. No.: 359,695

[22] Filed: May 31, 1989

[51] Int. Cl.[5] .............................................. C03B 27/00
[52] U.S. Cl. ...................................... 65/348; 65/172; 65/374.15; 428/131; 428/137
[58] Field of Search ...................... 65/172, 182.2, 260, 65/262, 348, 351, 374.15; 239/596, 600; 428/131, 137

[56] References Cited

U.S. PATENT DOCUMENTS

| | | | |
|---|---|---|---|
| 1,593,134 | 7/1926 | Niedecken | 239/600 |
| 3,510,288 | 5/1970 | Rowe et al. | 65/348 |
| 3,607,196 | 9/1971 | Garvey | 65/348 |
| 4,263,035 | 4/1981 | Dorey | 65/348 |

Primary Examiner—Joye L. Woodard
Attorney, Agent, or Firm—Gregory F. Wirzbicki; Michael A. Kondzella

[57] ABSTRACT

An apertured dead plate insert fabricated of a contact material, preferably graphite, and a correspondingly apertured dead plate subplate together constitute a dead plate assembly which is used in the hot end process area of glass bottle manufacture. The assembly can be easily repaired by replacement of the contact material insert. Use of the dead plate assembly reduces damage to hot formed glass bottles and results in increased production rates. The dead plate subplate is a rigid plate with a planar depression having an area corresponding to the area of the insert defined on one face by mounting lugs and an area of increased height on the other face corresponding to the area of the depression so as to provide a heat sink for the subplate in order to keep the insert at a relatively constant temperature variant during passage of air therethrough.

20 Claims, 3 Drawing Sheets

DEAD PLATE ASSEMBLY

FIELD OF THE INVENTION

This invention relates to the field of glass-making. In one of its more particular aspects, this invention relates to a fixture for holding a piece of contact material used in glass container forming machines. In another of its more particular aspects this invention relates to the combination of a fixture and a contact material specially adapted for use in the fixture.

BACKGROUND OF THE INVENTION

Hot glass, especially when formed into various shapes in the manufacture of glass containers, is susceptible to being damaged by contact with glass processing equipment. Most of the equipment with which hot glass comes in contact in the hot end process area during the process of manufacturing containers such as glass bottles is fabricated from metallic materials such as stainless steel and other alloys. However, in certain areas of the hot end processing of glass containers, it has been found desirable to utilize non-metallic materials such as asbestos, plastics, or carbon fibers.

One such application is in the plates which rest upon the air plenums of glass container-forming machines known as dead plates. These plates are fabricated with a multiplicity of apertures to permit the flow of air from the plenum. Adjustable air flow causes the formed glass bottles to be suspended above the plenum and to cool the bottles sufficiently for contact handling. The plates must be heat resistant and non-absorbent with respect to the oils used in bottle production.

Of the materials which have previously been used for dead plates, asbestos is undesirable for environmental reasons. Plastics suitable for use at the high temperatures encountered in the hot end process area must be specially formulated. Stainless steel and other metal alloys used for dead plates, while otherwise satisfactory, are subject to failure due to warpage, bending, gouging or breakage.

Metallic dead plates may cause checking by momentary contact with the hot formed bottles. Checking is the formation of imperceptible cracks due to sudden localized heat transfer or thermal shock.

In addition to ordinary wear of dead plates, damage can occur during crashes in the processing line. Where a dead plate is damaged and requires replacement, there is a loss of production while the production line is shut down until the dead plate can be replaced and the work station where the dead plate is located can be brought back on line at operating temperatures.

It would, therefore, be desirable to provide a dead plate which can be easily repaired or replaced in the event of wear or damage.

SUMMARY OF THE INVENTION

The present invention provides a dead plate assembly comprising a dead plate subplate and a contact material insert. The assembly is designed in such a way that the contact material is effectively strengthened thereby reducing the danger of breakage. The contact material can be readily replaced in the event of failure. The dead plate assembly of the present invention comprises (a) a contact material insert; (b) a dead plate subplate comprising a rigid plate having a multiplicity of apertures therein, and one or more lugs usually at the edges thereof, defining a depression on one face of said plate; and (c) means (e.g. fasteners) for attaching said contact material insert to said plate. In the preferred embodiment, the other face of the plate has a raised area corresponding to said depression.

The dead plate assembly of the present invention is designed to be retrofitted to the air plenums of glass container-forming machines to provide a dead plate which is less susceptible to warpage, bending, gouging or breakage than the metal alloys previously used, which is temperature resistant and non-absorbent, which is easily repaired or replaced in the event of wear or damage, and which will effectively reduce damage to glass containers and increase production rates.

BRIEF DESCRIPTION OF THE DRAWINGS

The invention will be more readily understood by reference to the accompanying drawings wherein like numerals refer to like elements and in which.

DESCRIPTION OF THE PREFERRED EMBODIMENTS

Figure 1:
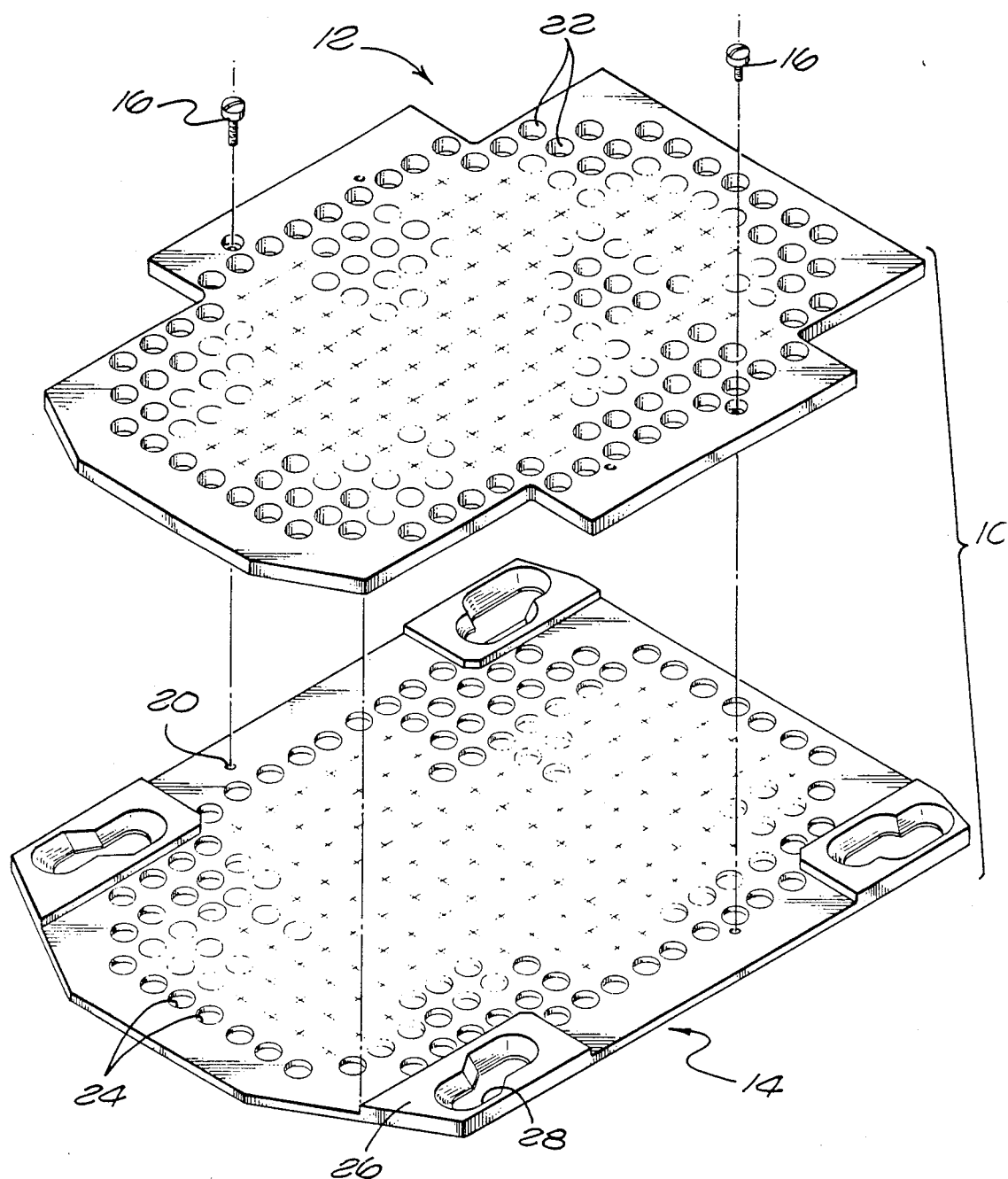
FIG. 1 is an exploded perspective view of one embodiment of the dead plate assembly 10 of the present invention showing the contact material insert 12 separated from the dead plate subplate 14.

Referring to FIG. 1 of the drawing, numeral 10 designates the dead plate assembly of the present invention. The dead plate assembly comprises dead plate contact material insert 12 and dead plate subplate 14 which are connected by means of screws 16 using screw holes 18 in dead plate insert 12 and threaded screw holes 20 in dead plate subplate 14 positioned at opposed lateral edges thereof. Dead plate insert 12 contains a multiplicity of uniformly distribution apertures 22. Dead plate subplate 14 contains a corresponding multiplicity of apertures 24. At the corners of dead plate subplate 14 are lugs 26 which contain slotted mounting holes 28. Apertures 22 in dead plate insert 12 and apertures 24 in dead plate subplate 14 are superimposed upon fitting the dead plate insert 12 into the depression formed on the top face of dead plate subplate 14 by lugs 26. The area of the depression corresponds to the area of dead plate insert 12. In the embodiment shown in FIG. 1, the top and bottom faces of dead plate subplate 14 are substantially planar.

Figure 2:
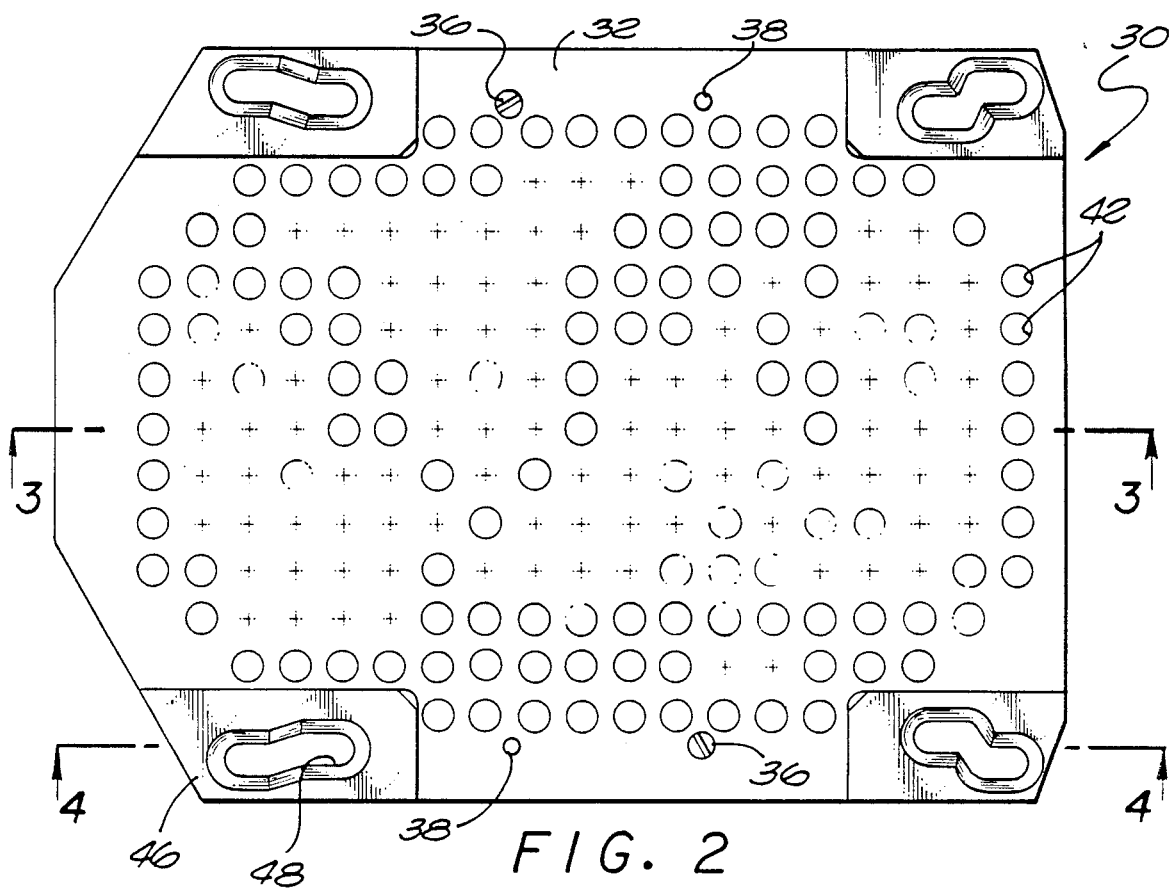
FIG. 2 is a top plan view of another embodiment of the dead plate assembly 30 of this invention showing the contact material insert 32 connected to the dead plate subplate 34.
Figure 3:
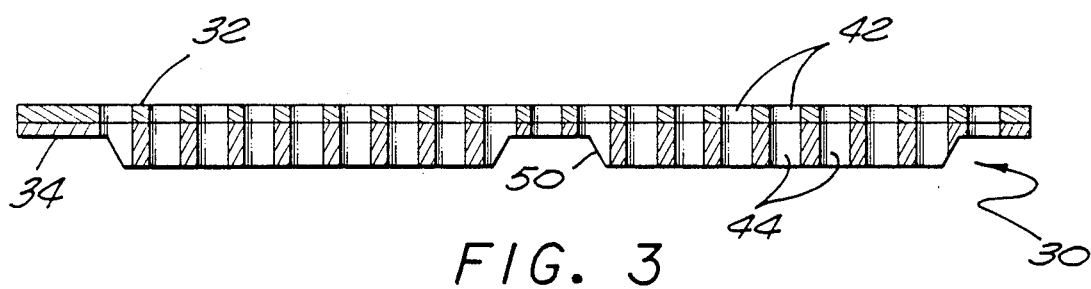
FIG. 3 is a cross-section along the line 3—3 of FIG. 2.
Figure 4:
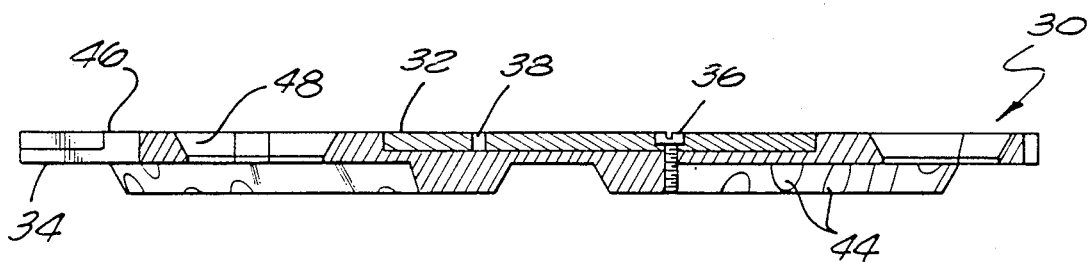
FIG. 4 is a cross-section along the line 4—4 of FIG. 2.
Figure 5:
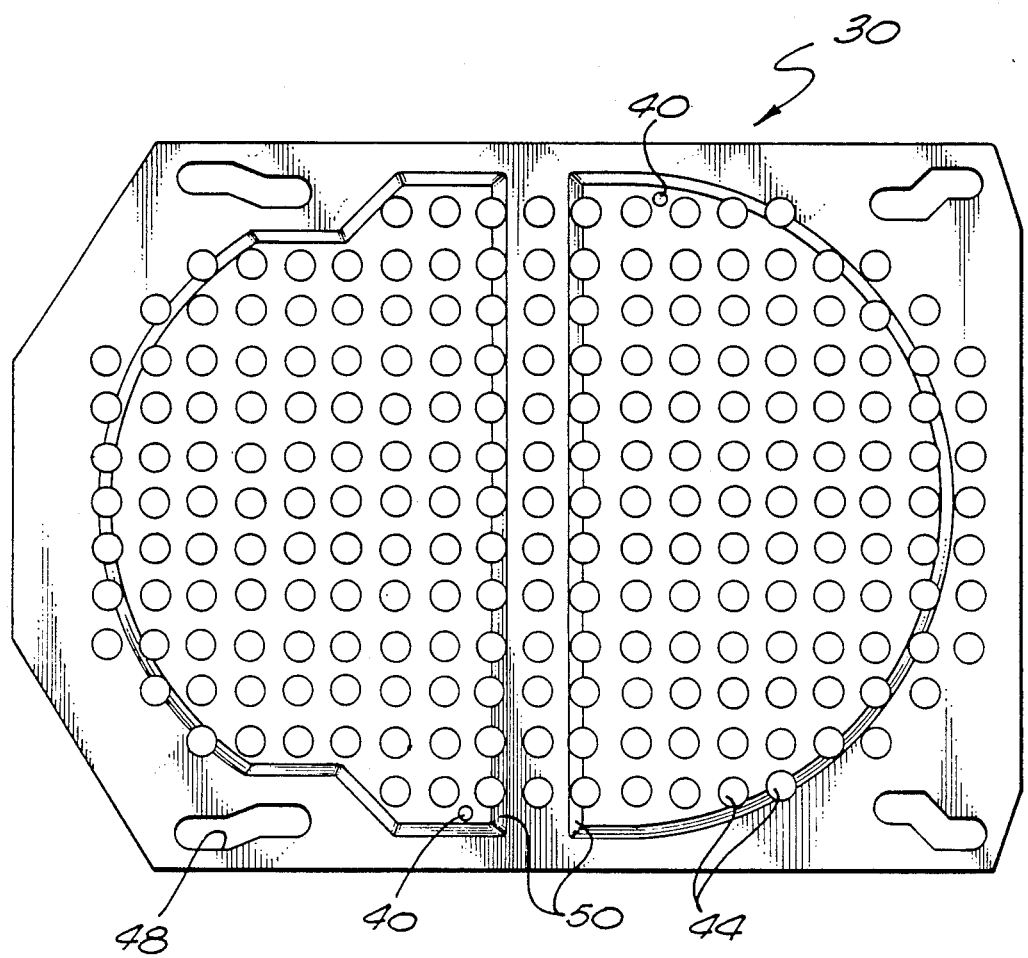
FIG. 5 is a bottom plan view of the embodiment of FIGS. 2, 3 and 4.

A second embodiment is shown in FIGS. 2, 3, 4 and 5. This embodiment differs from the first described embodiment in that the bottom face of the dead plate subplate is not planar. Rather, it contains an area of increased height which corresponds to the area of the depression. The area of increased height may include raised areas corresponding to zones in trhe air plenum to which the subplate is attached during use. The function of the raised area or areas of increased height is to provide a heat sink for the dead plate subplate in order that the dead plate insert may be kept at a relatively constant temperature variant during passage of air through the dead plate assembly from the air plenum to which the dead plate assembly is attached. The raised areas have a height at least equal to the depth of the depression formed on the top face of the dead plate subplate. In this second embodiment, which is preferred, the numeral 30 designates the dead plate assembly, which comprises a dead plate insert 32, and a dead plate subplate 34. The dead plate insert 32 is attached to dead plate subplate 34 by means of screws 36, which are screwed into screw holes 38 in dead plate insert 32 and thread screw holes 40 in dead plate subplate 34 positioned at opposed lateral edges thereof. Dead plate insert 32 contains a multiplicity of uniformly distributed apertures 42. Dead plate subplate 34 contains a corresponding multiplicity of uniformly distributed apertures 44. Apertures 42 in dead plate insert 32 overlie apertures 44 in dead plate subplate 34 when dead plate insert 32 is positioned upon dead plate subplate 34 (FIG. 3). Lugs 46 are positioned at the corners of dead plate subplate 34 and form a depression into which dead plate insert 32 fits. The area of the depression corresponds to the area of dead plate insert 32. Lugs 46 are provided with slotted mounting holes 48. As can be seen in FIGS. 2 and 5, slotted mounting holes 48 are generally S-shaped interconnected slotted holes in order to provide a means of attachment to various designs of air plenums. Shown in FIGS. 3, 4 and 5 are raised areas 50 which project downward from dead plate subplate 34. Screw holes 40 are positioned in raised areas 50.

In use, the contact material insert is placed in the depression on the top surface of the dead plate subplate and fixed into position by means of screws. In a preferred embodiment the screw holes in the contact material insert are so arranged that the insert can be reversed rather than merely replaced. That is, by turning over the contact material insert, the screw holes will be aligned with the screw holes in the dead plate subplate In this manner both sides of the contact material insert can be used, effectively doubling the life of the insert.

The contact material insert preferably used with the dead plate assembly of the present invention is composed of graphite. One particular graphite contact material that has achieved wide use in hot glass processing is GLASSMATER®graphite contact material, which is available from POCO Graphite, Inc., Decatur, Texas. Graphite of this type is preferred because of its low friction ratio and its low abrasiveness.

The dead plate assembly of the present invention can be used in glass container-forming machines of any desired configuration, due to the particular design of the assembly and especially the design of the slotted mounting holes in the lugs holding the contact material insert in position on the dead plate subplate. It is easily repaired simply by reversing or replacing the contact material insert.

While particular embodiments of the invention have been described, it will be understood, of course, that the invention is not limited thereto, since many obvious modifications can be made. It is intended to include any such modifications as will fall within the scope of the appended claims.

We claim:

1. A substantially rigid plate having a multiplicity of apertures therein, and one or more lugs defining a planar depression one one face of said plate, the other face of said plate having an area of increased height corresponding to the area of said depression.

2. A plate according to claim 1 wherein said multiplicity of apertures are uniformly distributed throughout said depression.

3. A plate according to claim 2 wherein said other face of said plate has at least two areas of increased height.

4. A plate according to claim 2 wherein said one or more lugs are provided with slotted mounting holes for mounting upon a work station.

5. A plate according to claim 4 wherein said slotted mounting holes are S-shaped interconnected slotted holes.

6. A plate according to claim 4 wherein said area of increased height has a height at least equal to the depth of said depression.

7. A plate according to claim 6 additionally having a pair of threaded apertures positioned at opposed lateral edges of said plate.

8. A plate according to claim 7 wherein said pair of threaded apertures are positioned in said area of increased height.

9. A dead plate assembly which comprises
   (a) a contact material insert having a multiplicity of apertures;
   (b) a dead plate subplate comprising a substantially rigid plate having a multiplicity of apertures therein, and one or more lugs defining a planar depression on one face of said plate, the other face of said plate having an area of increased height corresponding to the area said depression; and
   (c) means for attaching said contact material insert to said subplate so that said multiplicity of apertures in said insert and said multiplicity of apertures in said plate are so positioned that they together form a multiplicity of continuous apertures.

10. A dead plate assembly according to claim 9 wherein said contact material insert is fabricated of graphite.

11. Dead plate assembly according to claim 10 wherein said multiplicity of apertures in said plate are uniformly distributed throughout said depression.

12. A dead plate assembly according to claim 11 wherein said other face of said plate has at least two area of increased height.

13. A dead plate assembly according to claim 12 wherein said at least two area of increased height correspond to zones of a work station of a glassware forming machine.

14. A dead plate assembly according to claim 11 wherein said one or more lugs are provided with slotted mounting holes for mounting upon a work station of a glassware forming machine.

15. A dead plate assembly according to claim 14 wherein said slotted mounting holes are S-shaped interconnected slotted holes.

16. A dead plate assembly according to claim 14 wherein the area of said depression corresponds to the area of said insert.

17. A dead plate assembly according to claim 16 wherein said of increased height has a height at least equal to the depth of said depression.

18. A dead plate assembly according to claim 17 wherein said means for attaching said insert to said plate comprises threaded means.

19. A dead plate assembly according to claim 17 wherein said means for attaching said insert to said subplate connects said insert to said plate at opposed lateral edges of said plate.

20. A dead plate assembly according to claim 19 wherein said means for attaching said insert to said plate connects said insert to said plate in said area of increased height.

* * * * *

UNITED STATES PATENT AND TRADEMARK OFFICE
CERTIFICATE OF CORRECTION

PATENT NO. : 4,966,619

DATED : October 30, 1990

INVENTOR(S) : Shelby M. Withrow

It is certified that error appears in the above-identified patent and that said Letters Patent is hereby corrected as shown below:

Claim 11, column 4, line 35, before "Dead plate assembly", insert therefor -- A --.

Claim 12, column 4, line 40, delete "area" and insert therefor -- areas --.

Claim 17, column 4, line 56, after "said", insert therefor -- area --.

Signed and Sealed this

Eighteenth Day of February, 1992

Attest:

HARRY F. MANBECK, JR.

*Attesting Officer*      *Commissioner of Patents and Trademarks*